United States Patent
Hamilton

[11] Patent Number: 6,145,876
[45] Date of Patent: Nov. 14, 2000

[54] VEHICLE INFLATOR WITH STORED GAS FOR SUPPLEMENTING INFLATION

[75] Inventor: Brian K. Hamilton, Littleton, Colo.

[73] Assignee: OEA, Inc., Aurora, Colo.

[21] Appl. No.: 09/245,498

[22] Filed: Feb. 5, 1999

Related U.S. Application Data

[63] Continuation-in-part of application No. 09/178,380, Oct. 23, 1998.

[51] Int. Cl.[7] .................................................... B60R 21/26
[52] U.S. Cl. ............................................ 280/736; 280/737
[58] Field of Search ................................ 280/736, 737, 280/740, 741, 739; 102/530

[56] References Cited

U.S. PATENT DOCUMENTS

| | | | |
|---|---|---|---|
| 3,721,456 | 3/1973 | McDonald | 280/736 |
| 5,078,422 | 1/1992 | Hamilton et al. | 280/736 |
| 5,348,344 | 9/1994 | Blumenthal et al. | 280/737 |
| 5,351,988 | 10/1994 | Bishop et al. | 280/737 |
| 5,378,018 | 1/1995 | Ketterer et al. | 280/737 |
| 5,423,570 | 6/1995 | Kort et al. | 280/736 |
| 5,553,889 | 9/1996 | Hamilton et al. | 280/736 |
| 5,558,367 | 9/1996 | Cuevas | 280/737 |
| 5,566,976 | 10/1996 | Cuevas | 280/737 |
| 5,582,426 | 12/1996 | O'Loughlin et al. | 280/736 |
| 5,582,806 | 12/1996 | Skanberg et al. | 422/305 |
| 5,584,505 | 12/1996 | O'Laughlin et al. | 280/741 |
| 5,613,702 | 3/1997 | Goetz | 280/736 |
| 5,630,619 | 5/1997 | Buchanan et al. | 280/741 |
| 5,639,117 | 6/1997 | Mandzy et al. | 280/741 |
| 5,664,802 | 9/1997 | Harris et al. | 280/736 |
| 5,709,406 | 1/1998 | Buchanan | 280/736 |
| 5,788,275 | 8/1998 | Butt et al. | 280/737 |
| 5,938,235 | 8/1999 | Butt | 280/737 |
| 6,037,279 | 3/2000 | Brookman et al. | |

*Primary Examiner*—J. J. Swann
*Assistant Examiner*—Christopher Bottorff
*Attorney, Agent, or Firm*—Sheridan Ross P.C.

[57] ABSTRACT

An inflator system that includes an inflatable and an inflator apparatus having a supplemental gas assembly is provided. The supplemental gas assembly supplies gas to the inflatable in order to maintain a desired inflatable volume and pressure for a relatively longer period of time. The inflator apparatus also includes a pyrotechnic inflator. The supplemental gas assembly and the pyrotechnic inflator can be activated at essentially the same time using the same initiator assembly. The supplemental gas assembly preferably has a stored gas that weighs less than 200 grams.

17 Claims, 10 Drawing Sheets

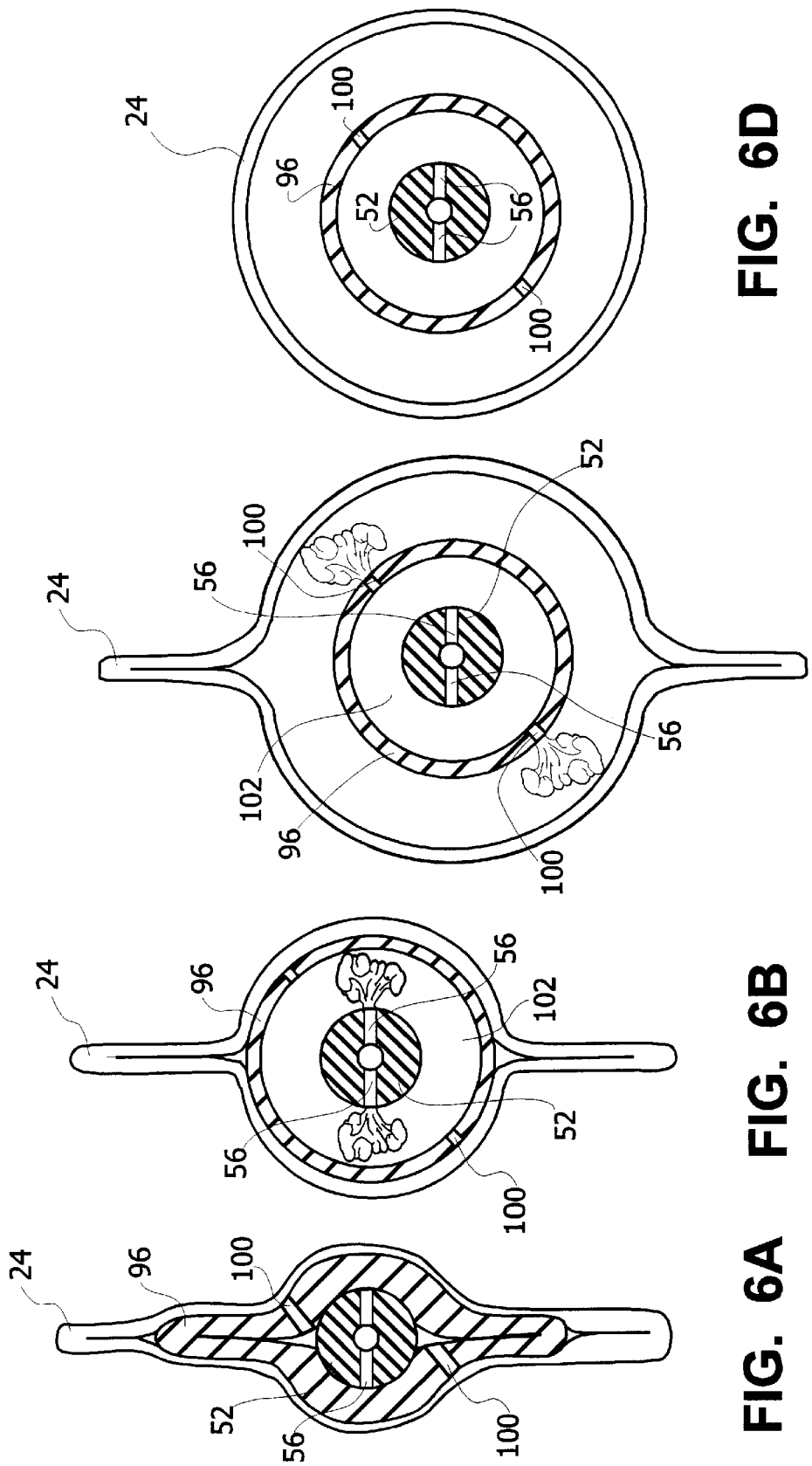

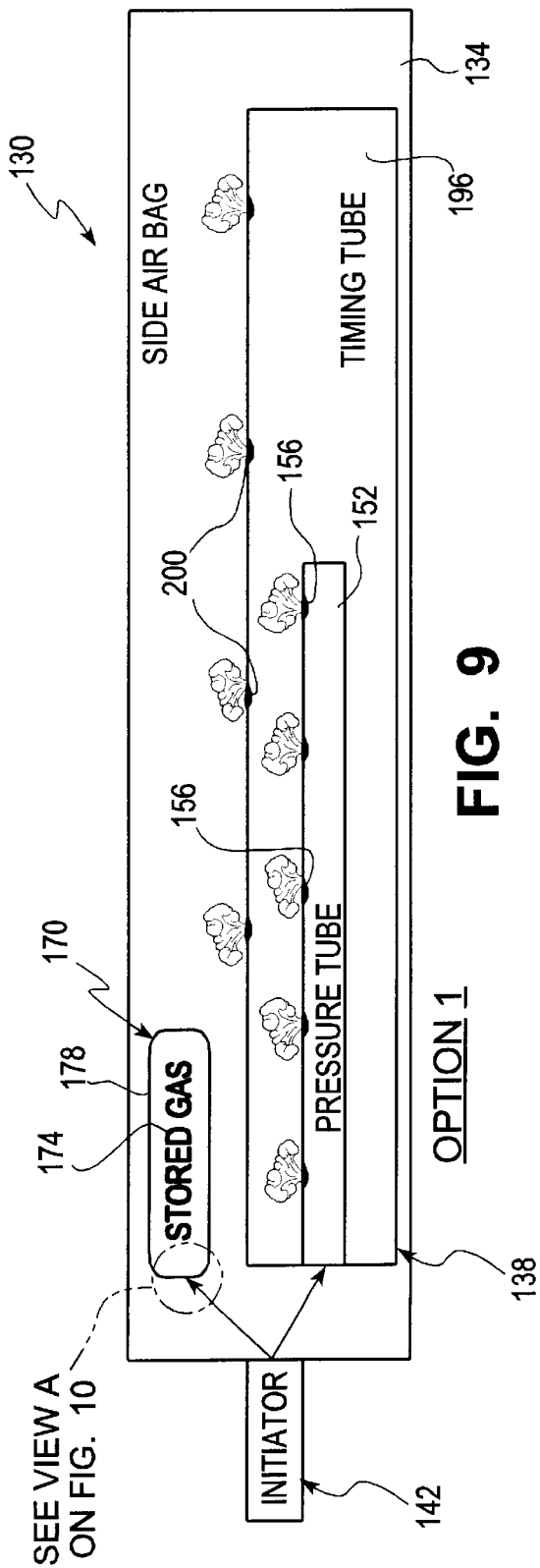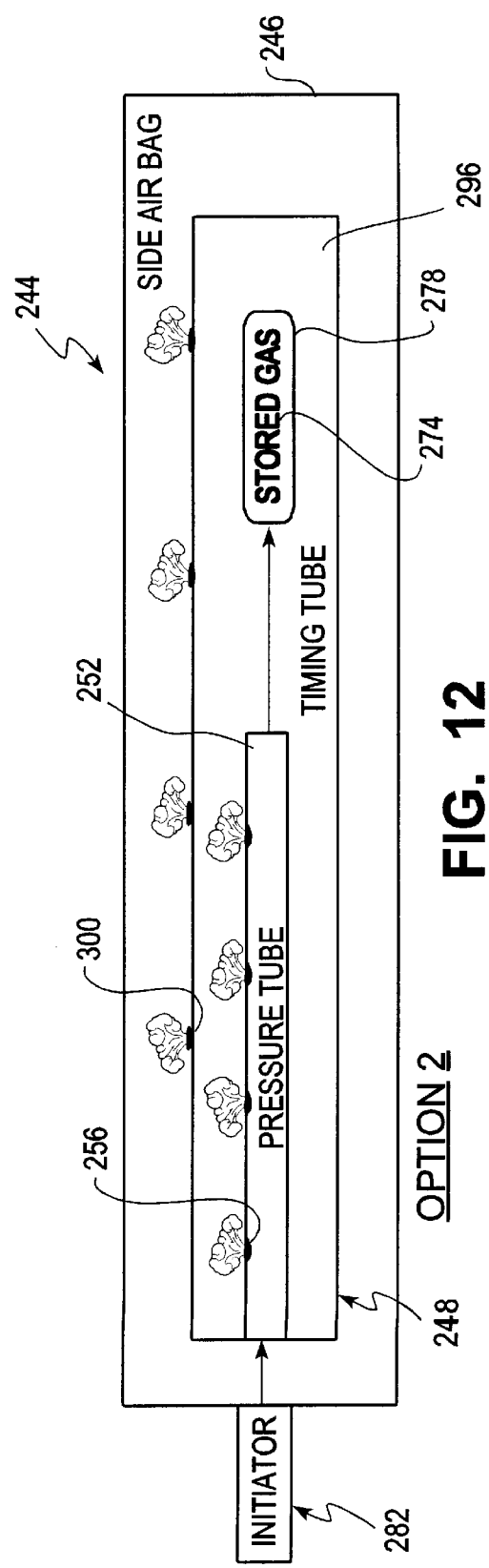

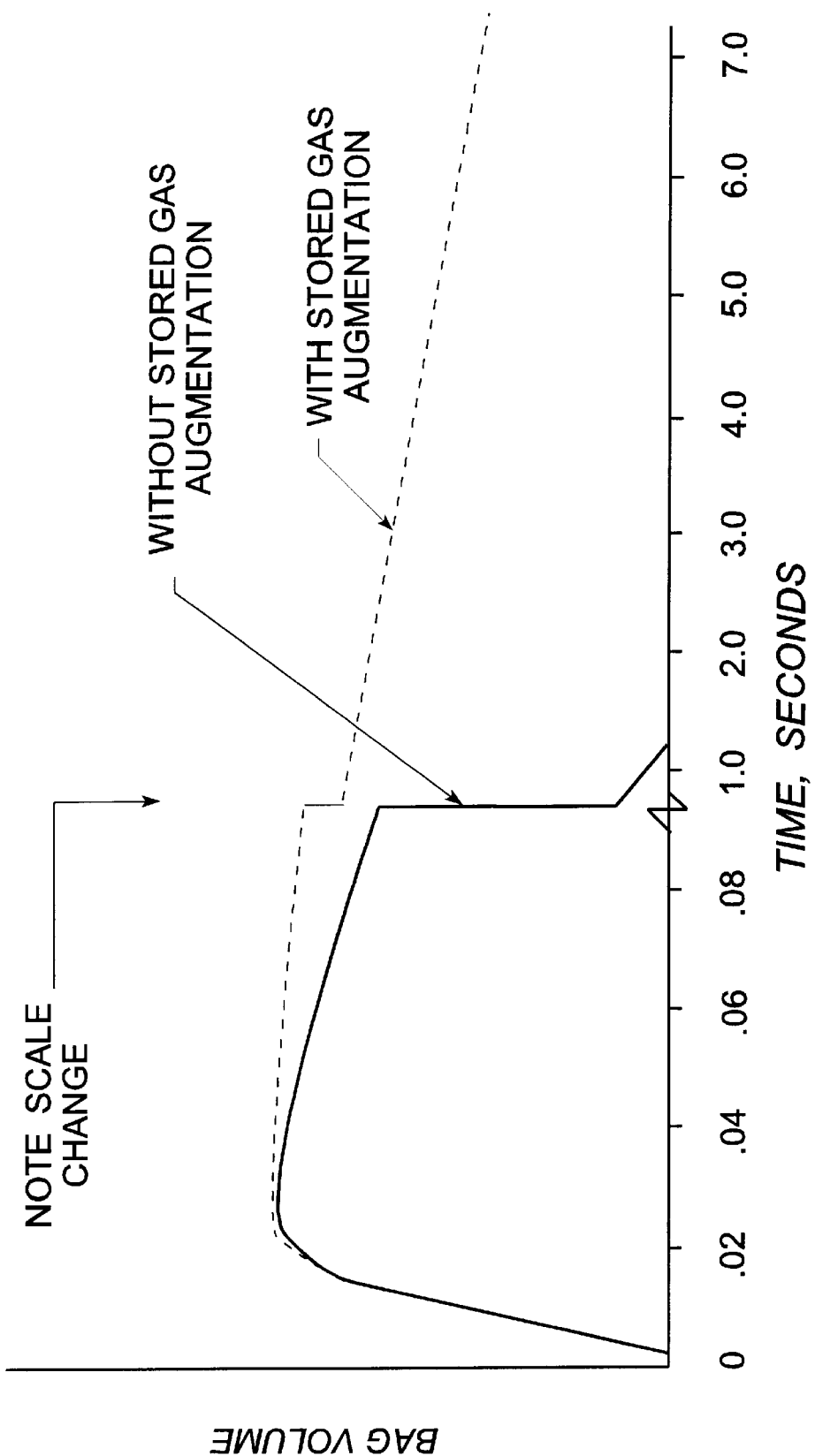

VEHICLE INFLATOR WITH STORED GAS FOR SUPPLEMENTING INFLATION

This is a continuation-in-part application of Ser. No. 09/178,380 filed Oct. 23, 1998.

FIELD OF THE INVENTION

The present invention relates to providing an inflation gas that supplements a main inflation gas or gases for maintaining desired pressure/volume in a vehicle inflatable.

BACKGROUND OF THE INVENTION

Inflation systems in vehicles have been devised for a number of different applications, particularly in the context of the locations of the inflator systems in the vehicles. Inflator systems can be classified according to their locations in the vehicles and can be identified as: driver side inflator systems, passenger side inflator systems, curtain inflator systems and side inflator systems. The curtain inflator system is located above the side window or windows of the vehicle. They typically extend for a much greater length, in comparison with other vehicle inflator systems. Curtain inflator systems are intended to protect the driver and/or passenger(s) when the vehicle having the curtain inflator system is impacted or experiences a collision along the side of the vehicle. When this happens, the vehicle may spin or otherwise move out of control such that, particularly in comparison with a head on collision, the vehicle may continue to impact or be impacted by one or more other vehicles and/or objects located along the road. During any such occurrence, it would be beneficial for the curtain inflator system to include an inflatable that maintains a desired pressure and volume for a relatively longer period of time. In that way, the inflatable continues to protect the vehicle occupant(s) from further collisions. In meeting this key objective, however, it is important that the size, weight and cost of the inflator system not be appreciably increased. Consequently, it would be advantageous to provide an inflator system, such as a curtain inflator system, that maintains desired gas pressure and volume in the inflatable for a longer period of time.

SUMMARY OF THE INVENTION

Method and apparatus are provided that maintain pressure and volume in a vehicle inflatable or air bag. The inflatable pressure and volume are maintained above desired thresholds for at least a predetermined time interval after activation of the inflator apparatus. The apparatus is part of an inflator system, which includes the inflatable. The inflator apparatus itself includes a pyrotechnic inflator and a supplemental gas assembly. The supplemental gas assembly includes a stored gas or gases that are to be used to maintain desired gas pressure and volume in the inflatable. In one embodiment, the supplemental gas assembly includes a vessel or container that houses stored gas. In another embodiment, the supplemental gas assembly includes a hybrid inflator, which also has a propellant that, when activated, is used to expand the stored gas of the supplemental gas assembly. The apparatus also includes at least one initiator assembly that, when triggered or ignited, causes activation of the pyrotechnic inflator. In a preferred embodiment, the same initiator assembly also activates the supplemental gas assembly to cause its release or other use in connection with filling the inflatable. Preferably, the activation of the supplemental gas assembly and the pyrotechnic inflator occur at the same time or substantially the same time, although a time delay may be incorporated whereby the supplemental gas assembly does not provide the stored or supplemental gas to the inflatable until after a predetermined time has passed from activation of the pyrotechnic inflator.

The pyrotechnic inflator includes a gas generating material or propellant that, when activated or ignited, results in generation of the main volume of gas that is supplied to the inflatable for initially pressurizing it. The composition of the propellant may include a number of different materials having a variety of weight percentages. In one embodiment, the weight of the propellant is at least about 4 grams. In a preferred embodiment, the pyrotechnic inflator includes a confining member or pressure tube that surrounds the propellant. In one embodiment, the confining member includes a number of layers. A number of holes are spaced at predetermined distances from each other along the length of the confining member. In that regard, such spaced holes are preferably created when seals or weakened areas of the confining member rupture or open when the propellant is ignited. In another embodiment, the holes are present before the propellant is combusted. The confining member length, less end terminations, is equal, or substantially equal, to the length of the propellant. The confining member is preferably made of a non-metallic material that can withstand a pressure of at least 3,000 psi and preferably 4,000 psi and greater.

Preferably in the embodiment that includes the pressure tube, the apparatus also includes a timing member or tube that surrounds at least substantial portions of the confining member and propellant. The timing member can be rigid or it can be flexible, e.g., made of a coated fabric or the like. The timing member controls flow of inflation gas to the air bag or inflatable. In that regard, the timing member includes one or more orifices through which inflation gas can pass when the propellant is ignited and products of combustion, including the inflation gas, are generated. The timing member regulates flow of the inflation gas to the inflatable at a desired rate. In the preferred embodiment, a number of orifices are formed along the length of the timing member. The inflatable surrounds the timing member and therefore receives the inflation gas along its length at substantially the same uniform rate to uniformly fill the inflatable along its length. Like the confining member, the timing member is also preferably made of a non-metallic material that reduces its cost and package size.

With respect to the supplemental gas assembly, the container or vessel for housing one or more gases under pressure can include a gas-containing cartridge that can house one or more gases, such as nitrogen, argon and/or helium. In one embodiment, the initiator assembly directly activates or causes the release of the stored gas from the vessel. Specifically, the initiator assembly causes a release device or pin of the supplemental gas assembly to be moved and thereby open the stored gas vessel in order to release the stored gas through one or more metering orifices. In this embodiment, the stored gas vessel can be disposed outwardly or exteriorly of the timing tube and within the inflatable. In another embodiment, the initiator assembly indirectly activates or causes the release of the stored gas. The initiator assembly ignites the propellant in the confining member. The force or pressure from the activated propellant results in release of the stored gas from the stored gas vessel. In such an embodiment, the stored gas vessel is located within the timing member. Regardless of the embodiment, the stored gas has a weight of less than about 200 grams and, in one preferred embodiment, has a weight less than about 60 grams, particularly when the embodiment is a curtain inflator system.

With regard to activation of the apparatus, a total output parameter is definable. Under test conditions using a closed tank, the total output relates to a closed tank pressure that is created when the inflator apparatus is activated within the closed tank. Such a tank pressure directly relates to the volume of gas in the inflatable when an equivalent inflator apparatus is activated within the inflatable. The total output has a peak value or peak total output (greatest total output) less than one second after activation of the propellant and, preferably, less than 0.1 second after such activation. The peak total output is essentially due to the ignition of the propellant within the confining member. However, over time, the total output is primarily due to the stored gas augmentation to the inflatable. More specifically, at about seven seconds after activation of the inflator apparatus, the total output is at least 60% of the peak total output. In the absence of the supplemental gas assembly including the stored gas augmentation to the inflatable, at about seven seconds after activation of the inflator apparatus, the total output is substantially less than 60% of the peak total output.

In the context of operation of the inflator system in a vehicle when a predetermined event occurs, such as a vehicle collision exceeding a predetermined threshold impact, the propellant is activated and the stored gas is released at the same time, or substantially close in time. The inflatable experiences a peak volume of gas within 0.1 second. The supplemental gas assembly supplies increasing amounts of supplemental gas, in comparison with the propellant gas. At about seven seconds after activation of the propellant, the vehicle occupant remains protected by an inflatable that still has about 60% of the peak volume that it had when the propellant was ignited. This maintaining of volume and pressure in the inflatable for a relatively longer period of time is intended to enhance protection for the vehicle occupant(s), especially in vehicle side impacts or collisions.

The inflator apparatus has particular utility in curtain inflator system applications in which the current inflator system is located along the side windows of the vehicle. In such a case, the propellant is preferably an elongated propellant. However, other sizes or lengths of propellant may be incorporated into such an inflator system. Alternatively also, instead of a cartridge or vessel containing stored gas as the source of supplemental gas for augmenting the volume of the inflatable, a hybrid inflator might be substituted. In such an embodiment, a pressurized medium or pressurized gas in the hybrid inflator constitutes at least portions of the stored gas. When this hybrid inflator is activated, the pressurized medium of the hybrid inflator is caused to expand due to the hot propellant gases being generated. Thus, hybrid inflator propellant gases and the stored pressurized medium can together constitute a stored gas that supplements the pyrotechnic propellant gas.

In view of the foregoing summary, a number of salient features of the present invention are immediately recognized. An inflator system is provided that includes a supplemental gas assembly for maintaining gas volume and pressure in an inflatable for a relatively longer period of time. Consequently, the inflator system safeguards the vehicle occupant(s) for a greater time. This is especially advantageous during vehicle collisions where there are multiple impacts over time. The weight and size of the inflator system with supplemental gas are maintained within desired limits. Inflator system parts and assembly thereof are kept at acceptable cost levels. The preferred embodiment incorporates a pyrotechnic inflator and a source of supplemental gas. The source of supplemental gas preferably includes a vessel containing stored gas that is released. In another embodiment, a hybrid inflator that includes stored gas is provided.

Additional advantages of the present invention will become readily apparent from the following discussion, particularly when taken together with the accompanying drawings.

BRIEF DESCRIPTION OF THE DRAWINGS

FIGS. 6A–6D are cross-sectional views of the inflator system that schematically illustrate flow of inflation gases to an inflatable when the propellant is activated;

FIG. 9 schematically illustrates one embodiment of an inflator system in which the initiator assembly directly activates an inflator apparatus and a supplemental gas assembly;

FIG. 11 is a graph that illustrates pressure in the inflatable over time, with and without the supplemental gas; and FIG. 12 schematically illustrates another embodiment in which the initiator assembly indirectly releases stored gas from a vessel.

DETAILED DESCRIPTION

Figure 1:
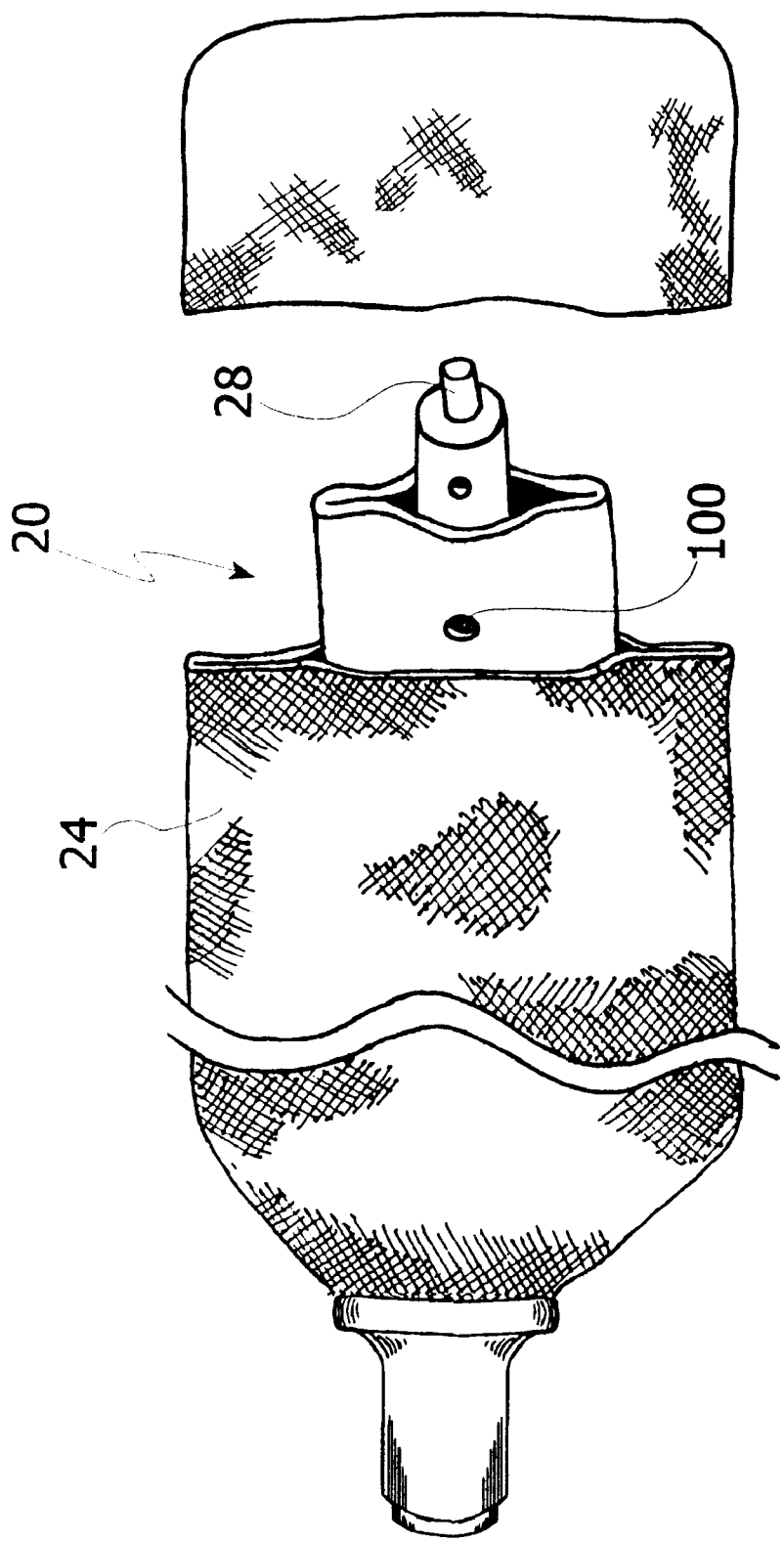
FIG. 1 is a perspective view use schematically illustrating an inflator system.

The present inventions are described in greater detail in the context of embodiments related to inflators for use in a vehicle, although the features and functions of the gas generating apparatus are suitable for other applications. With reference to FIG. 1, an inflator 20 is schematically illustrated for use with an inflatable or air bag 24. In one embodiment, the inflator 20 includes an elongated propellant 28. When ignited, the propellant 28 combusts and generates products of combustion including inflation gases that are used to inflate the air bag 24. The inflator 20 and the air bag 24 are located within a vehicle. The inflated air bag 24 is useful in protecting the vehicle occupant against serious injury.

The propellant composition can include a number of different materials, provided that such a composition achieves a number of objectives. These include generation of a sufficient inflation gas yield for pressurizing the inflatable 24; a resulting temperature after ignition of the propellant that is within an acceptable range (not too great a resulting temperature); and the products of combustion after activation of the propellant must be stoichiometrically balanced, e.g., no unacceptable amounts of carbon monoxide (CO) should be part of such combustion products (sufficiently oxidized). In that regard, the propellant composition need not be one that has a "smokeless" result after activation. In one embodiment, as will be described later herein, a further objective of the propellant composition relates to its ability to propagate ignition down a relatively long confining member or pressure tube that surrounds the propellant.

With regard to the composition of the propellant 28, it is characterized by being part of a pure pyrotechnic inflator. A pure pyrotechnic inflator refers to an inflator in which substantially entirely all gases provided by the inflator are propellant gases generated by the solid gas-generating propellant 28. For a pure pyrotechnic inflator, there is no need to store a pressurized gas or medium and the inflator is free of, or does not have, a stored, pressurized gas. Preferably, the propellant 28 has a composition that is substantially free of metals so that the propellant gases are substantially free, or in the absence of, metal-containing particulate and/or condensable materials, eliminating the need for a filter to remove any such particulate and/or condensable materials. Furthermore, in a preferred embodiment, the propellant 28 is substantially free of halogen-containing materials so that the propellant gases are substantially free, or in the absence, of halogen-containing components.

In a preferred embodiment, the composition of the propellant includes at least a fuel-rich material, an oxidizer material and a porosity producing material, which has one or more components that also constitute a binder system of the propellant. The fuel-rich material refers to a material that contains oxygen in its molecular structure, if at all, in an amount that is smaller than a stoichiometric amount of oxygen that would be required, during a self-sustained combustion reaction, to convert all hydrogen that may be in the fuel-rich material to water and to convert all carbon that may be in the fuel-rich material to carbon dioxide. If the fuel-rich material were combusted alone, it would produce gaseous decomposition products including a significant amount of carbon monoxide and/or hydrogen, both of which are undesirable for purposes of inflating an inflatable or air bag located in a vehicle. In one embodiment, the fuel-rich material has a primary component that is a majority, by weight, of the fuel-rich material. In one embodiment, the primary component of the fuel-rich material is a gun-type propellant. Gun-type propellants, as used herein, constitute secondary explosives and are high-temperature, fuel-rich components such as single, double, or triple-based propellants and nitramine propellants such as LOVA (low vulnerability ammunition) and HELOVA (high energy, low vulnerability ammunition) propellants. Such gun-type propellants have a combustion temperature in the range from about 2500° K to about 3800° K and typically greater than about 3000° K. Examples of suitable gun-type propellants include nitramine-based propellants having as major ingredients RDX (also known as hexahydrotrinitrotriazine or cyclotrimethylene trinitramine) or HMX (also known as cyclotetramethylenetethranitramine). PETN (also known as pentaerythritol tetranitrate) and TAGN (also known as triaminoguanadine nitrate) could also serve as major ingredients in gun-type propellants. Other suitable gun-type propellants include those incorporating tetrazole-based compounds and triazole-based compounds, particularly five-aminotetrazole. Another fuel-rich material that is acceptable is nitroguanidine, which is the preferred primary component of the fuel-rich material for inflators having lengths comparable to their widths. It is preferred because nitroguanidine has a characteristic burn rate exponent (n) that is less than 1, unlike fuel-rich materials that have a characteristic burn rate exponent of about 1, e.g., RDX or HMX. For fuel-rich materials with an exponent of about 1, there is substantially greater difficulty in controlling their combustion stability. For inflators having their lengths about five times greater than their widths, on the other hand, fuel-rich materials with n equal to, or substantially equal to, 1 (e.g. RDX and HMX) are preferred in order to sustain combustion. Regardless of which fuel-rich material is employed, the amount, by weight, of the secondary explosive of the fuel-rich material in the propellant 28 is preferably at least 5% and, preferably, no greater than about 30% of the propellant 28.

The oxidizer material is preferably a nitrate compound that is free of metal-containing constituents so that the propellant gases, which are generated when the propellant 28 is combusted, are substantially free, or in the absence, of metal-containing particulate and/or condensable materials. The oxidizer material provides oxygen for oxidizing decomposition products of the fuel-rich material so that at least some of the hydrogen and/or carbon monoxide generated by the fuel-rich material during a combustion reaction will be oxidized to water and/or carbon dioxide, respectively. The oxidizer material of the propellant 28 is defined as a material capable of supplying oxygen to increase the ultimate yield of carbon dioxide and/or water from combustion products of the fuel-rich material and thereby reduce the ultimate yield of carbon monoxide and/or hydrogen from combustion of the fuel-rich material. More preferably, the oxidizer material comprises only elements selected from the group consisting of carbon, oxygen, nitrogen and hydrogen and, most preferably, the oxidizer material comprises only the elements of nitrogen, oxygen and hydrogen. Examples of preferred materials for use as the oxidizer material include oxygen-containing ammonium salts, such as ammonium nitrate and ammonium dinitramide. Ammonium nitrate is the particularly preferred oxidizer material. The amount of oxidizer material in the propellant, by weight, is in the range of about 50%–90%.

The porosity producing material that includes a binder system of the propellant 28 is provided to accommodate the phase change that the oxidizer material, such as ammonium nitrate, undergoes when subject to temperature changes, such as numerous temperature cycling from less than −30° C. to more than 80° C., e.g. 15 or more of such cycles. Ammonium nitrate undergoes a crystalline phase change and also a volume change accompanying the phase change during normal storage conditions. The porosity producing material provides a porous propellant composition when mixed or otherwise combined with the other materials of the propellant 28 so that the porosity, by volume, of the resulting propellant 28 is at least about 15% and, preferably, in the range of about 15%–40% (about 85%–60% of theoretical density). The porosity producing material preferably includes naturally occurring fibrous cellulose. Fibrous cellulose is a commonly available component, such as that available from pulp board or wood pulp that is typically used in paper making processes. The fibrous cellulose is comprised of a number of fibrous cellulose pieces or fibers. Each of the pieces has a length and a width and the lengths of the fibrous cellulose pieces are at least five times greater than their widths. In that regard, the widths of the fibrous cellulose pieces are in the range of about 2.5 microns–250 microns and the lengths of the fibrous cellulose pieces are in the range of about 1,000 microns–10,000 microns. The fibrous cellulose pieces are also different from non-fibrous cellulosic material such as nitrocellulose, cellulose acetate, and cellulose acetate butyrate. Consequently, fibrous cellulose or any fibrous cellosic material is included in a group that is acceptable as a component of the porosity producing material, while non-fibrous cellulosic materials are excluded from the group of acceptable components of the porosity producing material.

With respect to the binder system of the porosity producing material, it preferably includes hydroxypropylcellulose (HPC), although other known or conventional binder products could be utilized. The HPC contributes to suspending the solid ingredients of the propellant composition in connection with providing the appropriate rheology for extrusion. Other contributors to the binder system are the fibrous cellulose and a dispersal agent.

In addition to being part of the binder system, the dispersal agent is included in the propellant composition and works together with the HPC (or other appropriate component) for preventing unwanted agglomerating or clumping of the fibrous cellulose during the mixing process with other materials of the propellant 28. In particular, it has been observed or determined that, when mixing the materials to form the propellant 28, unwanted clumping or gathering of the fibrous cellulose into "balls" occurs. Such clumping is not acceptable in providing a uniform propellant composition. It is known to utilize a relatively large amount of carrier fluid, such as a solvent (e.g. alcohol based), in connection with mixing the propellant materials. However, prior to extruding or completing the formation of the propellant or propellant pieces, it is necessary to remove or evaporate the carrier fluid. This adds considerably to the cost and time involved with the propellant manufacturing process. In order to eliminate or substantially reduce these costly steps, while avoiding unacceptable clumping of the fibrous cellulose, a dispersal agent has been identified that disperses fibrous cellulose or otherwise prevents the fibrous cellulose from clumping together during the mixing process. Although not intended to be limited to a particular theory, it is believed that the dispersal agent acts in somewhat of a mechanical manner to separate or maintain separation of fibrous cellulose particles or pieces. The sizes of the dispersal agent pieces are substantially smaller than the sizes of the fibrous cellulose pieces. Preferably, the widths or diameters of the fibrous cellulose pieces are at least five times greater than the widths or diameters of the dispersal agent pieces. In one embodiment, the widths of the dispersal agent pieces are in the range of about 0.05–0.5 micron. In a preferred embodiment, the dispersal agent includes a product identified as Cellulon®.

Yet another preferred component of the porosity-producing material is a viscous liquid carrier that includes a solution of a plastic polymer and a solvent, for example, a solution of about 10%–30% by weight of the HPC and about 90%–70% by weight of alcohol or alcohol-water azeotrope. The liquid carrier facilitates the dispersal of the first and second components into a dough-like mixture. This provides the appropriate rheology for extrusion of the propellant.

Optionally, the porosity producing composition also includes colorant in substantially minor amounts. When included, the colorant functions to distinguish propellant configurations or lots.

When making the propellant 28, the fuel-rich material, the oxidizer material and the porosity producing composition including binder system are mixed together using a conventional and known process. Subsequent to the mixing, propellant 28 or propellant pieces are extruded. The formed propellant is a uniform or homogenous mixture or combination of the included materials. After extrusion, each propellant piece has a uniform composition throughout its length, with the fibrous cellulose pieces or fibers essentially remaining the same size that they had before being mixed with the other of the propellant components. In particular, throughout the entire cross-section of any selected cross-section of a propellant piece or propellant 28, there is a substantially uniform mixture of the included materials. For example, for each selected cross-section along the length of the propellant 28, any at least 1,000-micron portion of any selected cross-section has the same homogenous composition as any other at least 1,000-micron portion of the same selected cross-section. Such a uniform mixture or composition may be found in any 100-micron portion of the same selected cross-section of the propellant 28.

EXAMPLES

Example 1

A solid gas-generating propellant composition is comprised of the following materials or components, by weight percentage:

| | |
|---|---|
| Ammonium Nitrate (200 mesh) | 53.00% |
| Strontium Nitrate (200 mesh) | 15.00% |
| RDX (20 micron, screened 200 mesh) | 20.00% |
| Cellulose (estercell) 1861 | 5.00% |
| Cellulon (16.8% solids) | 2.00% |
| Hydroxypropylcellulose (medium grade) (HPC) | 5.00% |
| Colorant | 0.01% |

The components or materials of such a propellant are mixed with solvent comprising 90% n-propyl alcohol and 10% water. The solvent comprises about 18% of the mixture weight. From this mixture that includes the solvent and water, propellant pieces can be extruded. The extruded propellant is semi-rigid but has a porosity characteristic or property, with the porosity being at least about 15% by volume and preferably about 40%. This property of the propellant accommodates thermal expansion due to crystalline phase changes of the ammonium nitrate without sacrificing the desired degree of rigidity. The binder system of the propellant includes the cellulose, the HPC and the Cellulon® product. The HPC is an alcohol soluble polymer and contributes desired viscosity to the propellant composition in connection with providing the desired extruded propellant pieces.

Example 2

Like Example 1, the propellant 28 composition includes RDX as the fuel-rich material. The materials or components, by weight, for this example are as follows:

| | |
|---|---|
| Ammonium Nitrate (200 mesh) | 70.00% |
| RDX (20 micron, screened 200 mesh) | 20.00% |
| Cellulose (estercell) 1861 | 4.50% |
| Cellulon (16.8% solids) | 1.00% |
| Hydroxypropylcellulose (medium grade) (HPC) | 4.50% |
| Methyl violet | 0.01% |

The propellant of Example 2 meets thermal stability requirements and temperature cycling tests, as does the propellant of Example 1. In particular, each of these two propellant compositions remains functional in the inflator with which they are used, after being subjected to a temperature of 107° C. for a period of 400 hours. Such functionality means that the propellant ignites when acceptably exposed to an appropriate signal, after being subjected to such time and temperature conditions. With regard to temperature cycling tests, the propellant remains functional when it is subjected to a number of cycles of temperature changes between temperatures that are greater than 80° C. and less than −30° C.

Example 3

The propellant 28 of this example is characterized by replacement of RDX as the fuel-rich material by one or more other secondary explosives and, in this case, by nitroguanidine.

| | |
|---|---|
| Ammonium Nitrate (200 mesh) | 80.00% |
| 1-Nitroguanidine | 9.00% |
| Cellulose (estercell) 1861 | 6.00% |
| Cellulon (16.8% solids) | 1.00% |
| Hydroxypropylcellulose (medium grade) (HPC) | 4.00% |
| Methyl violet | 0.01% |

In addition to the nitroguanidine as a replacement for RDX, the secondary explosives of HMX, PETN, or the like could be utilized. The HPC could be replaced by other organic binders, such as other cellulose esters, vinyl acetate and/or polyvinyl alcohol, acrylic polymers and the like.

Example 4

Another propellant 28 that includes 1-nitroguanidine as the primary component of the fuel-rich material has the following materials or components:

| | |
|---|---|
| Ammonium Nitrate (200 mesh) | 77.50% |
| 1-Nitroguanidine | 15.00% |
| Cellulose (estercell) 1861 | 3.50% |
| Cellulon (16.8% solids) | 1.00% |
| Polyacrylate polymer | 3.00% |
| Colorant | 0.01% |

Like the propellant compositions of Examples 1 and 2, the propellants of Examples 3 and 4 also pass thermal stability testing. It is also noted that each of the propellant compositions of Examples 1–4 can be used in varied and differently configured pure pyrotechnic inflators. In that regard, such propellant compositions can be used in known or conventional pyrotechnic inflators, as well as the new pyrotechnic inflator designs disclosed later herein. Additionally, although polyocrylate is the binder component used in this example, other conventional or known binders could be employed such as polyurethane and HTPB.

In one embodiment of a propellant composition, no binder system is employed to bind a first material that includes a fuel-rich component as the primary component (majority by weight) and a second material that includes an oxidizer as the primary component (majority by weight). With respect to this embodiment, it is inapplicable and not intended to be utilized with the inflator embodiments described later herein, particularly those embodiments that have the confining member. The first material is preferably in the form of propellant grains and the second material is preferably in the form of oxidizer particles, such as prills. In this embodiment, the propellant grains are mixed with the oxidizer particles without any binder components, such as the polymeric binder (e.g., HPC), fibrous cellulose and/or dispersal agent to hold them together. However, a binder can be used in forming the propellant grains themselves that typically include more than the fuel-rich component. In this embodiment, the propellant grains and the oxidizer particles are separate from, but adjacent to, each other while contained in the inflator housing. The propellant grains and the oxidizer particles are combined or loosely mixed with each other when they are contained in the inflator housing. Each of the propellant grains can be defined as having an outer surface area and all of the propellant grains in the inflator housing can be defined as having a total outer surface area. Similarly, each of the oxidizer particles can be defined as having an outer surface area and all of the oxidizer particles in the inflator housing can be defined as having a total outer surface area. All, or substantially all, of the total outer surface area of the propellant grains is exposed to all, or substantially all, of the total outer surface area of the oxidizer particles. While the propellant grains and the oxidizer particles are contained in the inflator housing, and where they are mixed together, spaces are defined among the propellant grains and the oxidizer particles and such spaces are free of any binding component or material. Hence, the propellant grains and the oxidizer particles are contained in the inflator housing independently of binder material. In one embodiment, when appropriate or necessary to ensure that the propellant grains and the oxidizer particles are maintained in the inflator housing in desired positions relative to each other, a force or pressure is applied to the mixture of the propellant grains and the oxidizer particles. Such an applied force is sufficient to withstand transportation vibrations and avoid rattle that can occur. A mechanical member, such as a spring-type member, or other means, can be utilized in maintaining the desired relative positions of the propellant grains and the oxidizer particles in the inflator housing. In one embodiment, particularly as it relates to a driver side inflator, a force applying member is located at the end of the inflator housing having an initiator assembly and the mixture of propellant grains and oxidizer particles is located inwardly of this force applying member. The force applying member can include a number of embodiments such as a spring, a foam element and/or a fiber material, for example. In such an embodiment, all contact between the propellant grains and the oxidizer particles is between the exposed outer surfaces of the plurality of oxidizer particles and the plurality of propellant grains.

With respect to the constituents of the propellant grains and the oxidizer particles, they can be the same as previously described herein in connection with other embodiments, except that there is no binder system to bind the propellant grains and the oxidizer particles together.

Other examples of this embodiment are next provided.

Example 5

In this example, the propellant composition includes the following:

| Component | Wt. % | Relative Parts (Propellant Grains) | Relative Parts (Oxidizer Particles) |
|---|---|---|---|
| Nitroguanidine | 43.5% | 30 | — |
| Strontium Nitrate | | 15 | — |
| Acrylate Binder | | 5 | — |

| Component | Wt. % | Relative Parts (Propellant Grains) | Relative Parts (Oxidizer Particles) |
|---|---|---|---|
| Ammonium Nitrate | 46.5% | — | 100 |

The primary, fuel-rich component is nitroguanidine. The strontium nitrate is included to assist in desired burning of the propellant grains. The acrylate binder is beneficial in forming the extruded propellant grains and binding together the components of the propellant grains. When subjected to a standard vented bomb test, the propellant composition of Example 5 functioned satisfactorily and performed comparably to known propellant compositions used with vehicle inflators.

Example 6

This example is similar to Example 5, with the propellant composition including the following:

| Component | Wt. % | Relative Parts (Propellant Grains) | Relative Parts (Oxidizer Particles) |
|---|---|---|---|
| Nitroguanidine | 40% | 30 | — |
| Strontium Nitrate | | 15 | — |
| Acrylate Binder | | 5 | — |
| Ammonium Nitrate | 60% | — | 100 |

The propellant composition of this example was subjected to a closed bomb test that included a loose mixture of the propellant grains and the ammonium nitrate prills. Similar to the results of the testing associated with Example 5, the propellant composition of this example functioned satisfactorily and performed in a way comparable to known propellant compositions under equivalent tests. Although Examples 5 and 6 are described in terms of no binder system being employed to bind the propellant grains and the oxidizer particles, it should be understood that these two examples, like Examples 1–4, could incorporate a binder system like that disclosed in Examples 1–4.

Figure 2:
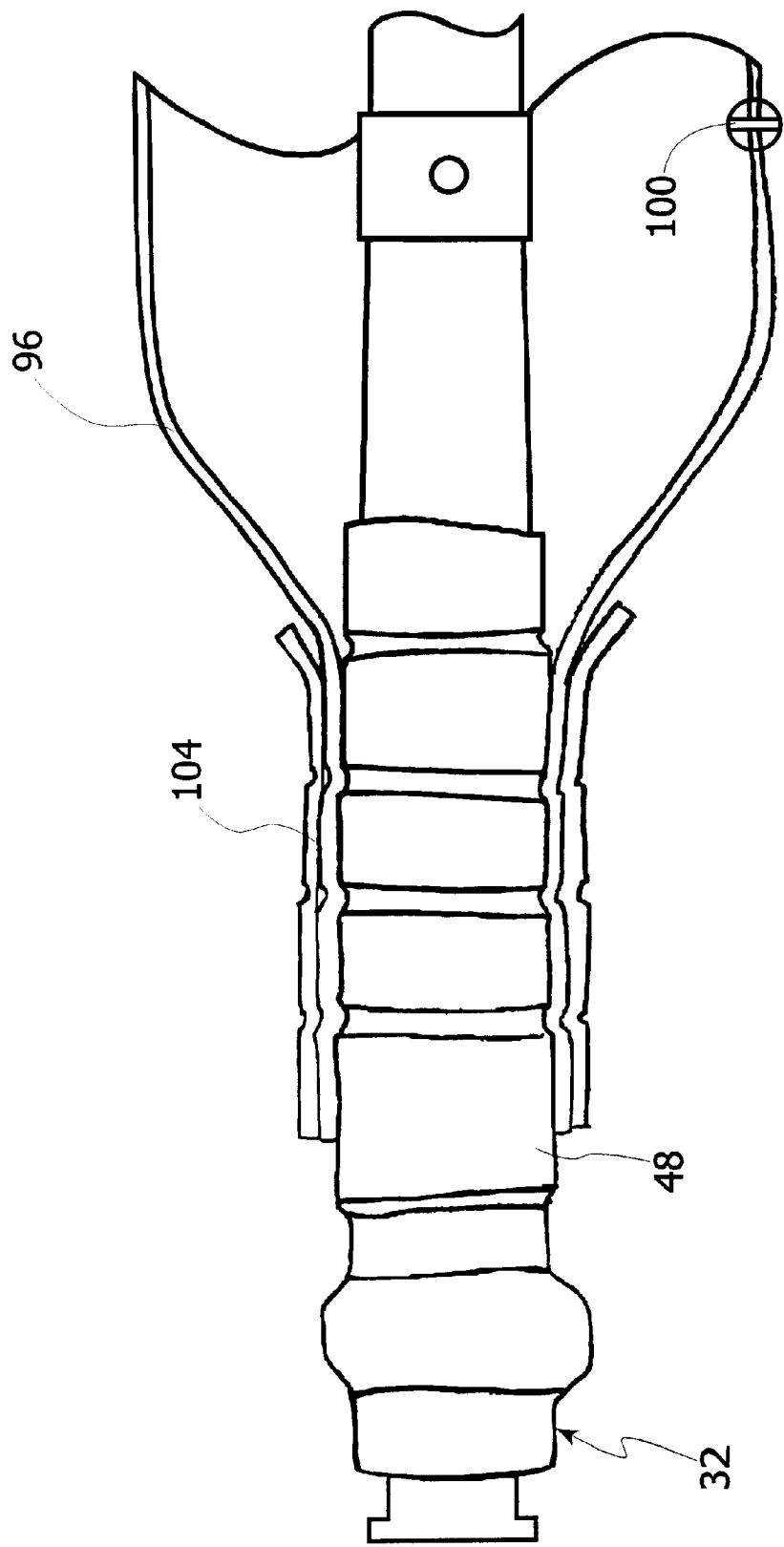
FIG. 2 schematically illustrates a longitudinal section of an inflator apparatus.
Figure 3:
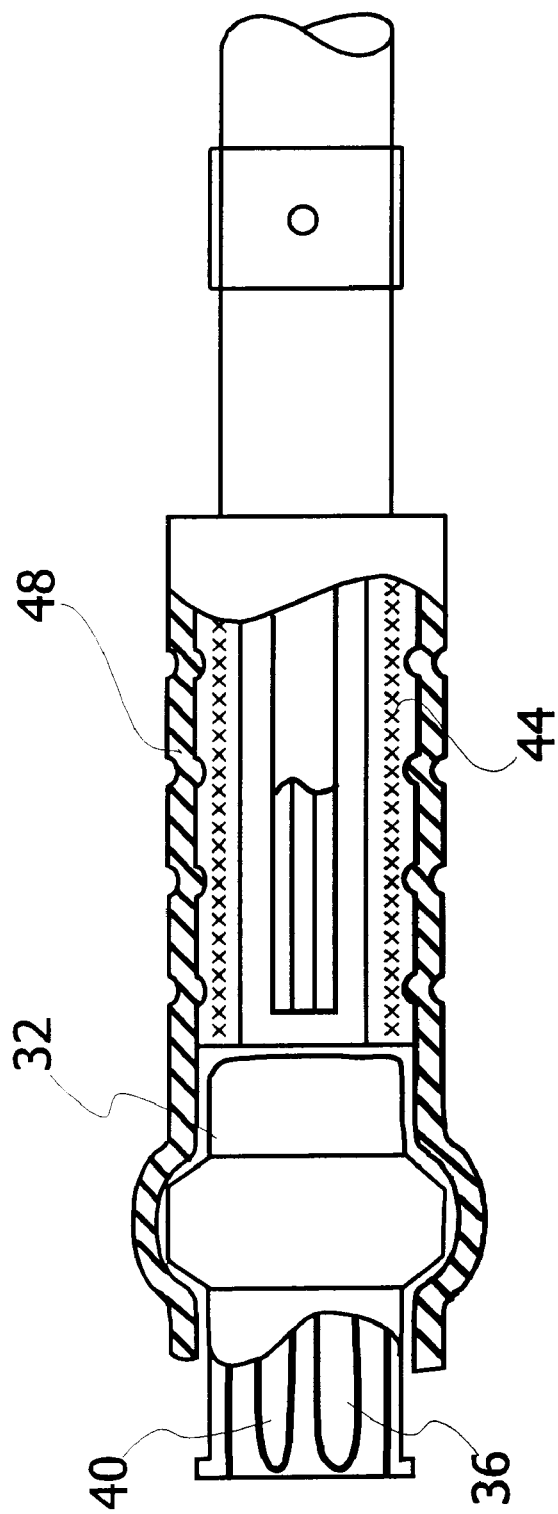
FIG. 3 schematically illustrates a longitudinal section of the inflator apparatus with portions cut away and without the timing member.
Figure 4:
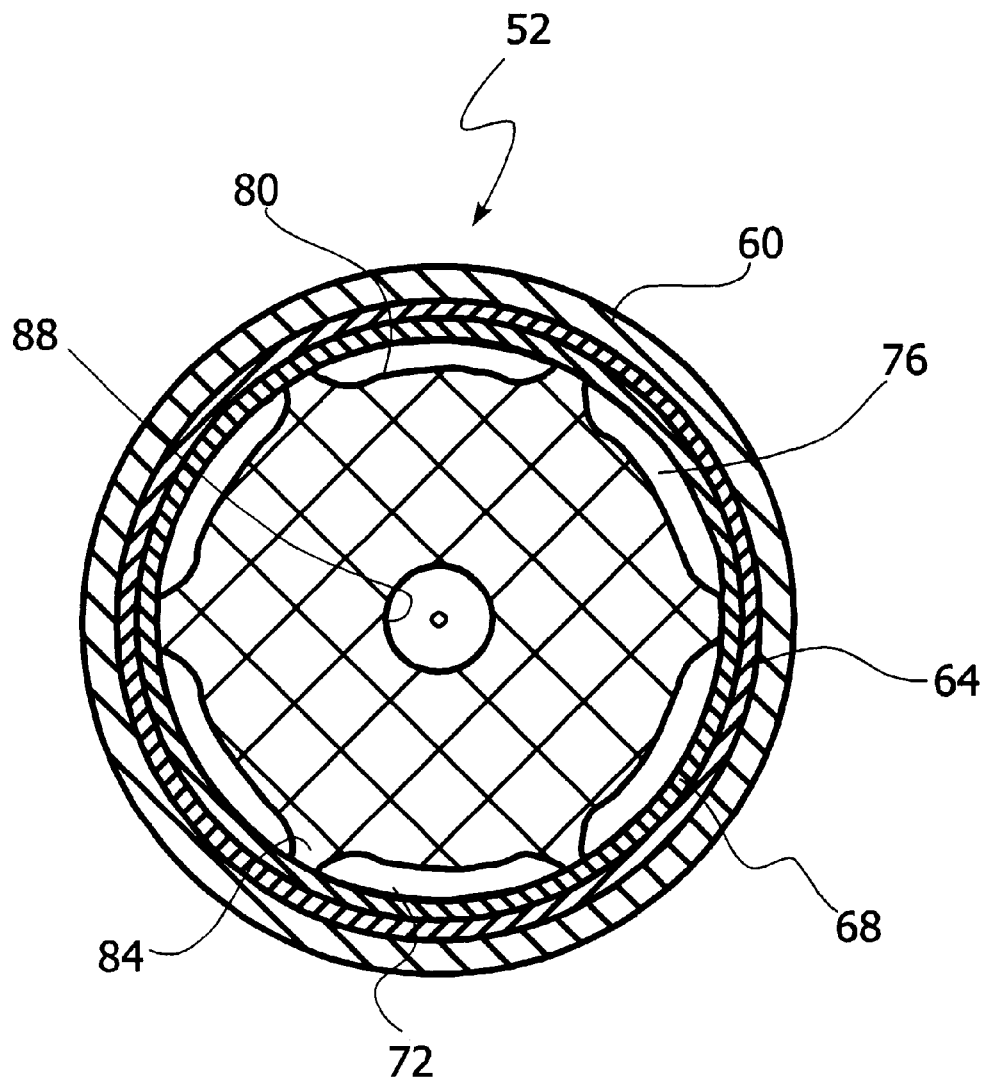
FIG. 4 illustrates a cross-sectional view of a confining member and propellant of the inflator apparatus.

With reference to FIGS. 2–4, as well as FIG. 1, the inflator 20 includes an initiator or activation assembly 32 for igniting the propellant 28. The initiator assembly 32 can be any one of a number of such well-known devices, such as that disclosed in U.S. Pat. No. 5,404,263, issued Apr. 4, 1995, entitled "All-Glass Header Assembly Used In An Inflator System" and assigned to the same assignee as the present invention. Briefly, the initiator assembly 32 includes a first conductive pin 36 and a second conductive pin 40, with the first conductive pin preferably being co-axial with the main housing or body of the initiator assembly 32. When an initiation or control signal is applied to the first conductive pin 36, the initiator assembly 32 is triggered to ignite the propellant 28. Such a control signal is indicative of the occurrence of a predetermined event related to a vehicle impact or collision, which initiates activation of the inflator 20.

The propellant 28 is located in close proximity to the initiator assembly 32 so that firing thereof results in ignition of the propellant 28 and the generation of products of combustion including inflation gases. The propellant 28 and the initiator assembly 32 are property disposed relative to each other and held in place using a housing 48 that surrounds main portions of the initiator assembly 32 and at least portions of the propellant 28 adjacent to the initiator assembly 32. In one embodiment, the confining member 52 includes a metal ferrule that is crimped about the confining member 52.

With particular reference to FIG. 4, the inflator 20 includes a confining member or pressure tube 52 that includes at least one layer. The confining member 52 has a number of spaced holes 56 (FIGS. 6B–6D). Such holes 56 are preferably, uniformly spaced along the length of the confining member, which length extends for the length of the elongated propellant 28. With regard to formation of the holes 56, they are preferably created using weakened areas or seals covering the holes 56 in the confining member that are opened or removed when the propellant 28 combusts and after a predetermined internal pressure is achieved sufficient to rupture or open the seals. In another embodiment, the spaced holes 56 are pre-formed or already exist before combustion of the propellant. The confining member 52 is made of material that is strong and highly-resistant to rupture or breaking, especially when the propellant 28 is ignited. That is, the confining member 52 does not break into particles or pieces when the propellant 28 is ignited. The confining member 52 can withstand dynamic pressures of about 3000 psi and greater. The holes 56 allow for the escape of products of combustion including inflation gases, rather than having the confining member 52 fragment or break up, as will be explained further in connection with the discussion of the generation of a "combustion wave" when the elongated propellant 28 is ignited. The confining member 52 is also preferably made of a material that allows for expansion of the holes 56, such as at least the outer layer of the confining member 52 being an extruded plastic sheath. In such a case, the holes 56 have an unexpanded state or size and an expanded state or size. When the inflator 24 is activated and the propellant 28 is ignited, the holes 56 increase in size to at least about 10% greater than their areas in their unexpanded state. Preferably, such an increase in size is in the range of 50%–400% over the areas of the holes 56 in their unexpanded state, which exists before activation of the inflator 20.

With further reference to FIG. 4, the confining member 52, in one embodiment, is comprised of three layers including an outer layer 60, an intermediate layer 64 and an inner layer 68. The outer and inner layers 60, 68 can both be extruded plastic sheaths and the intermediate layer 64 can be a braided reinforcement layer made of polyester, aramid, fiberglass or the like to withstand substantial pressures that are generated when the products of combustion are produced upon activation of the propellant 28.

The inner layer 68 of the confining member 52 has an inner wall 72 which is adjacent to the propellant 28. More specifically, a gap 76 having a gap area is defined between the inner wall 72 and an outer surface 80 of the propellant 28. In one embodiment, the space or distance between the inner wall 72 and the outer surface 80 of the propellant 28 is less than about 1 cm for at least a majority of the outer surface 80 of the propellant 28. The gap area defined by the gap 76 is useful in creating a desired combustion wave as will be explained later. As illustrated in FIG. 4, the gap 76 can be comprised of a series of open areas, with ridges 84 of the extruded propellant 28 separating such gap open areas. In addition to the gap 76, in one embodiment, the propellant 28 has a center bore 88 that is coaxial with the center longitudinal axis of the propellant 28. The center bore 88 is also useful in the propagation of the combustion wave that results when the propellant 28 is ignited.

In FIG. 4, the propellant 28 is illustrated as a single, elongated body of propellant. However, the propellant 28 may be comprised of two or more strands or pieces of propellant 28. It is necessary that each elongated propellant 28 meet a required length-to-diameter (L/D) ratio. Each such propellant 28 must have an L/D ratio of at least about 10, and preferably at least about 100, in order to provide a desired combustion wave. As should be appreciated, such an elongated propellant is linear in configuration and could be comprised of a number of propellant pieces that are arranged together in a linear manner.

With respect to the combustion wave, it refers to the essentially linear ignition of the elongated propellant beginning at its outer surface 80 and proceeding from a first end of the elongated propellant, adjacent to the initiator assembly 32, and proceeding to the second or opposite end of the propellant 28. The propagation of this combustion wave must meet a minimum propagation rate, namely, a combustion of 100 meters of propellant/sec, and preferably about 500 meters/sec. If the propagation rate is less than this minimum rate, improper ignition of the propellant 28 occurs and there is unacceptable performance in pressurizing the inflatable 24 with inflation gases. The propagation of the combustion wave is influenced by a number of factors including the size of the center bore 88 and the size of the gap 76. In particular, the combination of the sizes of the gap 76 and center bore 88 must be within certain ranges relative to the cross-sectional area of the confining member 52 (inner diameter thereof). Preferably, the ratio of the cross-sectional area of the propellant to the cross-sectional area of the inner diameter of the confining member is in the range of 0.10–0.60 in order to achieve a desired propagation of the combustion wave. That is to say, above and below such a range there is sporadic failure to completely propagate along the length of the propellant 28.

Although only one confining member 52 with propellant 28 has been described, it should be understood that more than one combination of confining member 52 and propellant 28 could be utilized as part of a single inflator. Each such propellant in a separate confining member 52 could be individually, controllably ignited by its own initiator.

In addition to the propagation rate, a number of other parameters influence the desired or proper generation of the combustion wave including the sizes of the holes 56 and the strength of the confining member 52, as well as propellant ballistic properties (combustion temperature, pressure sensitivity, gas yield, gas composition and any other relevant property), and the conditioning temperature associated with the confining member 52.

With particular reference to FIG. 2, the inflator 20 also preferably includes a timing member or outer tube 96 having one or more metering orifices 100. When present, the timing member 96 is used to regulate the flow or passage of inflation gases generated by the propellant 28 from the inflator 20 to the inflatable 24. The timing member 96 is located outwardly of the confining member 52 and extends for a length at least about equal to that length of the confining member 52 along which there are spaced holes 56. The timing member 96 is joined to other portions of the inflator 20 at its ends. At the end of the timing tube 96 adjacent to the initiator assembly 32, in one embodiment, the timing member 96 is clamped or otherwise held to the housing 48 using a clamp member or other connector 104, which surrounds portions of the housing 48. The timing member 96 regulates the flow of inflation gases so that such inflation gases do not enter or inflate the inflatable 24 at too great a rate. Instead, the timing member 96 contributes to a uniform, smooth filling of the inflatable 24 with inflation gases using the one or more metering orifices 100 formed through the wall of the timing member 96. In one embodiment, there are a number of spaced metering orifices 100 that begin adjacent to the end of the timing member 96 near the propellant 28 and which are located along the length of the timing member 96. Such a configuration has particular utility in connection with uniform filling of an inflatable 24 having a relatively long length.

Although this embodiment has been described and illustrated as including the timing member 96, it should be understood that one or more other embodiments may not include such a timing member 96. In particular, a propellant composition and/or confining member (pressure tube) 52 may be provided that eliminates the need for such a timing member 96. For example, a propellant composition may be provided that combusts in such a way that the inflation gas flow regulating function associated with the timing member 96 is rendered unnecessary.

Like the confining member 52, the timing member 96 is preferably made of a non-metallic material, such as a reinforced plastic or rubber-like material. This contributes to an overall reduction in weight and cost associated with the inflator 20. Although it is preferred that the confining member 52 and the timing member 96 be made of materials that are substantially free of or do not have metal, they could include metallic portions. In the case of the confining member 52, regardless of the material used, it remains worthwhile to have a confining member 52 with spaced holes 56, either initially sealed or pre-formed, that are able to increase in size when the propellant 28 is activated and products of combustion are generated. Additionally, the timing member could be used with or contain multiple combinations of confining member 52 and propellant 28 to provide the multiple stage inflator in which each such propellant can be controllably activated at different times.

Figure 5:
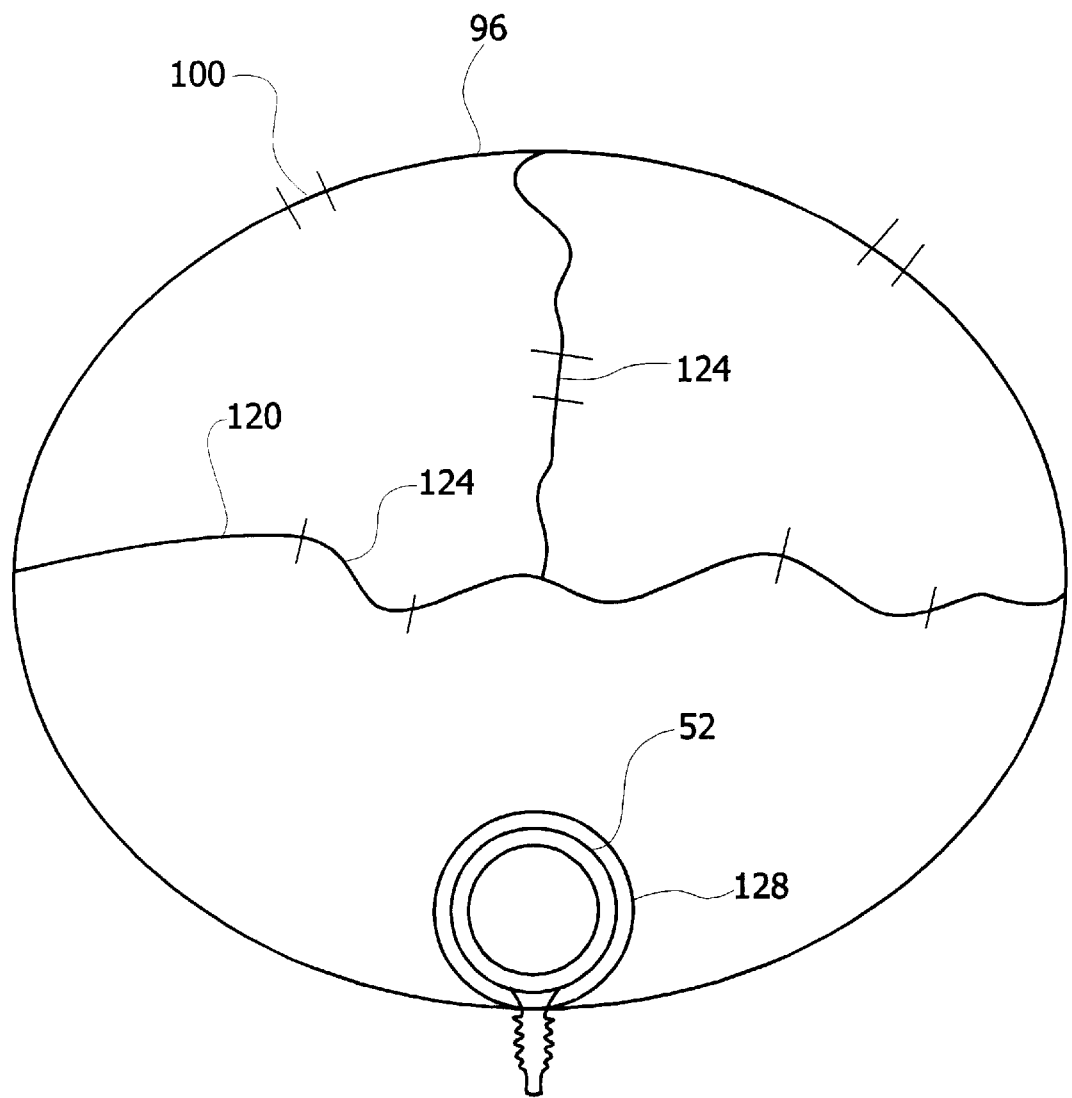
FIG. 5 illustrates membranes having heat absorbing surfaces attached to the inner wall of the timing member.

The timing member 96 also acts to remove excess heat from the generated gases by convection to the fabric surface of the timing member 96. If desired for a particular application, additional heat absorbing surfaces can be added by attaching non-structural membranes 120 to the inside of the timing member 96, as shown in the cross-section of FIG. 5. In this embodiment, a number of membranes 120 having openings 124 are attached to the inner wall of the timing member 96, such as by gluing, stitching or the like. The inflation gases from the confining member 52 pass through one or more of the openings 124 before exiting the metered orifices 100. The sizes of the openings 124 are typically greater than the sizes of the metered orifices 100. The membranes 120 have surfaces that are useful in absorbing heat as a result of the generated inflation gases. As also seen in FIG. 5, the confining member 52 is joined to inflator module hardware using a pressure tube mount 128 having portions located adjacent the circumference of the confining member 52. As can be further seen, parts of the outer wall of the pressure tube mount 128 are in contact with or tangent to the inner wall of the timing member 96.

Figure 8:
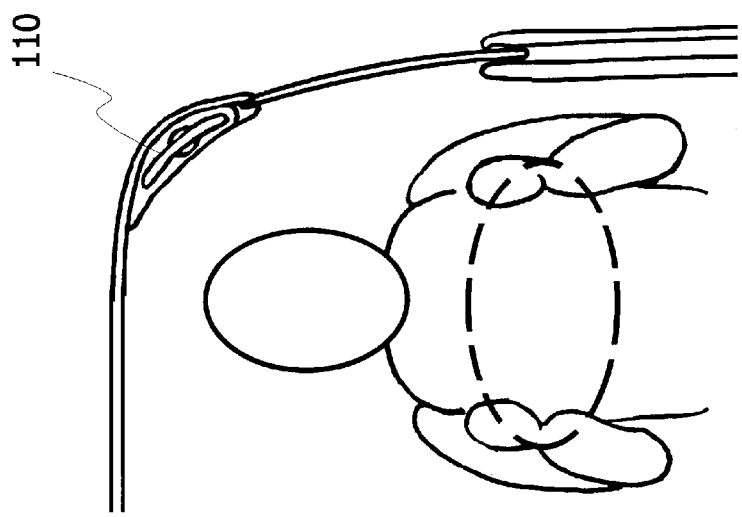
FIG. 8 schematically illustrates the curtain inflator system of FIG. 7 in a front view.
Figure 7:
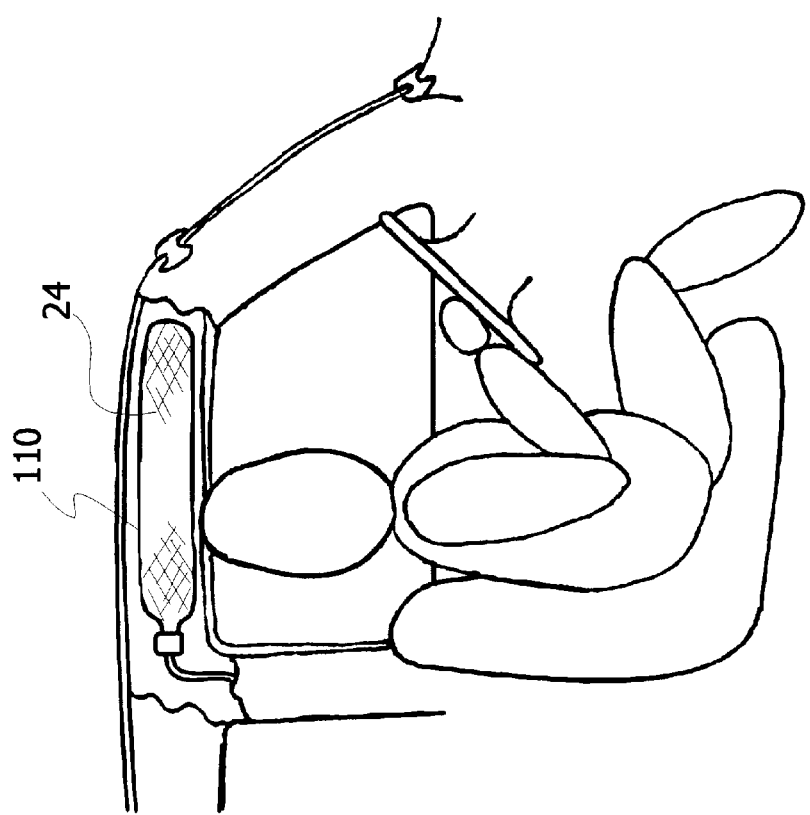
FIG. 7 schematically illustrates one application of the inflator system as a current inflator system with reference to a side view of a portion of a vehicle.

With regard to uniform filling of the inflatable 28, especially one that has a greater length, reference is made to FIGS. 6A–6D. This sequence of figures schematically illustrate inflation of the inflatable 24 when the initiator assembly 32 is fired and the propellant 28 is activated. In its quiescent or deactivated state, the propellant 28 has not yet been activated and no inflation gases have been generated. In FIG. 6B, an event has occurred that has caused the initiator assembly 32 to ignite the propellant 28, which thereby generates combustion products including inflation gases that exit the spaced holes 56 in the confining member 52, without essentially structurally rupturing or tearing the confining member 52. In the preferred embodiment, in FIG. 6B the holes 56 are unsealed upon combustion of the propellant. The inflation gases enter the chamber 102 of the timing member 96 and move radially outward from the outer layer 60 of the confining member 52 through the chamber 102 toward the wall of the timing member 96 as schematically illustrated in FIG. 6B. The inflation gases reach the wall and spaced metering orifices 100 of the timing member 96 and exit therethrough into the inflatable 24. As represented in FIG. 6C, there is a substantial uniform entry of inflation gases about the cross-section of the inflatable 24, as well as a uniform entry along the entire length of the inflatable 24. Such uniform entry of inflation gases is associated with a desired, regulated filling of the inflatable 24 by means of the predetermined spacing and sizing of the metering orifices 100. As seen in FIG. 6D, the inflatable 24 uniformly receives inflation gases and is uniformly filled or pressurized throughout its volume by means of the timing member 96. In accordance with this uniform filling, inflation gases directly from the inflator 20 are filling the entire inflatable 24, rather than inflation gases entering the inflatable 24 at a limited area such that, in order to complete filling of the inflatable 24, inflation gases in the inflatable 24 itself are required to move longitudinally within the inflatable 24 in order to achieve the desired force or pressure. Such non-uniform filling can result in the vehicle occupant being subjected to a less than desirable force due to the inflatable filling non-uniformly. With reference to FIGS. 7 and 8, one application of the inflator 20 is schematically illustrated. In such an application, the inflator 20 is used with an inflatable 24 that is located above one or more vehicle side windows. Such an inflator is commonly termed a "curtain" inflator. Such an inflator is particularly characterized by having a substantially greater length, particularly in comparison with driver, passenger, and side impact inflators. As seen in FIGS. 7 and 8, a curtain inflator module 110 is schematically shown above the driver side window. In this application, the inflator 20 is substantially elongated and has a length that is at least one-half the length of the inflatable 24 and preferably is substantially equal to the length of the inflator 20. Consequently, when the inflator 20 is activated to deploy or inflate the inflatable 24 of the curtain inflator module 110, there is a substantial uniform filling of the inflatable 24 along its length. The generation and entry of inflation gases to the inflatable 24 depend on achieving a minimum propagation rate associated with the combustion wave. That is to say, the filling of the inflatable 24 along its entire length at substantially the same time is limited by, or dependent on, the rate at which the elongated propellant 28 is ignited beginning at its end adjacent to the initiator assembly 32 and continuing to its opposite end.

Although the inflator 20 of the present invention has particular utility in connection with such a curtain inflator module 110, it should be understood that such an inflator 20 is useful in all types of vehicle inflators including driver, passenger, and side impact inflators. Based on the unique design, fewer parts and reduced manufacturing cost, such an inflator need not be dedicated to one application but can be configured for use as a driver, passenger, side impact and/or any other inflator. In addition, the present inventions described herein have applicability to more than inflators in a vehicle and are not to be limited thereto. These inventions can be employed in a number of applications that involve or require a gas generating apparatus. That is, the gas generating embodiments of the present invention have utility in a variety of applications where a generated gas performs one or more functions. For example, the gas generating functions can be used with vehicle pre-tensioner devices or other seatbelt hardware. The gas generating features can also be provided with systems found in aircraft or missiles where generated gases are required for certain functions.

It should also be understood that other uses or technical fields might employ certain benefits associated with the propellant composition disclosed herein. More specifically, a dispersal agent is disclosed as part of the propellant composition, which overcomes clumping or unacceptable composition formation problems by essentially mechanically dispersing portions of the composition that are included for binding purposes. Such a dispersal material need not be limited to propellant compositions. Such a dispersal material avoids or reduces the use of other materials, such as massive quantities of fluids for suspension of the fibrous materials, that are commonly used in avoiding such clumping problems (e.g., in paper making), but need to be removed (evaporated or strained therefrom) in order to complete the formation of the composition. The dispersal process disclosed herein can be beneficial in solving such clumping problems and achieving desired mixing, while avoiding use of excessive fluids as part of the mixture in providing the desired composition.

A further embodiment that utilizes the confining member/timing member combination is illustrated in FIG. 9. In this embodiment, a desirable feature is incorporated related to the pressure and/or volume being maintained in the inflatable or air bag. This particular inflator system 130 maintains gas volume in its inflatable 134 above a predetermined threshold for a relatively longer predetermined time interval. As a result, the inflatable 134 has greater volume for a longer period of time during which the vehicle occupant is protected against additional or continued vehicle impacts or collisions with other vehicles and/or encountered objects.

As schematically illustrated in FIG. 9, the inflator system 130 also includes an inflator apparatus, preferably a pyrotechnic inflator 138. In the preferred embodiment, the pyrotechnic inflator 138 is comparable or equivalent to the previously described inflator apparatus of FIG. 1. Generally, the pyrotechnic inflator 146 includes a confining member or pressure tube 152 having a plurality of spaced holes 156. A timing member or tube 196 surrounds the confining member 152 and includes a number of orifices 200. Although it need not be so configured, the timing member 196 is illustrated as having a greater length than the length of the confining member 152. Furthermore, the orifices 200 are shown as being spaced at different intervals along the length of the timing member 196, in comparison with the holes 156 of the confining member 152.

The inflator system 130 also includes an initiator assembly 142 that is triggered or activated upon the occurrence of one or more predetermined events. Such an event includes detection of a vehicle collision or impact above a predetermined level, which generates a signal that is applied to the initiator assembly 142 and activates it. The triggering of the initiator assembly 142 as previously discussed in connection with the embodiment of FIG. 1, causes ignition or activation of the pyrotechnic inflator 138, i.e., the propellant or gas generating material of the pyrotechnic inflator 138 ignites and generates propellant or inflation gases for filling the inflatable 134, as previously described.

Unlike the previous embodiments, the inflator system 130 includes a supplemental gas assembly 170 that functions or is activated to provide supplemental gas or gases to the inflatable 134. In the preferred embodiment, the supplemental gas assembly 170 includes supplemental or stored gas 174 housed in a container or vessel 178 having a structure that properly contains the stored gas under desired pressure. In one embodiment, the supplemental gas assembly 170 comprises a cartridge that contains gas(es), such as nitrogen, argon and/or helium. When activated, the supplemental gas assembly 170 supplies supplemental gas to the inflatable 134 in a manner, or at a rate, that desirably maintains the volume of gas or gases in the inflatable 134 for a longer period of time, particularly in comparison with other inflator systems, including that disclosed in FIG. 1 of this application.

In the preferred embodiment, the initiator assembly 142 initiates release of the stored gas 174 at the same time it is activating the pyrotechnic inflator 138. Thus, at the same time, or substantially the same time, the same initiator assembly 142 is activating the propellant of the pyrotechnic inflator 138 and releasing the stored gas 174 from the vessel 178. In one or more other embodiments, a delay can be interposed between the triggering of the initiator assembly 142 and the release of the stored gas 174. With respect to release of the stored gas 174, in the embodiment of FIG. 9, the supplemental gas assembly 170 is located outwardly or exteriorly of the pyrotechnic inflator 138 including the timing member 196 thereof, but the output of the supplemental gas assembly 170 remains in communication with the inflatable 134.

Figure 10:
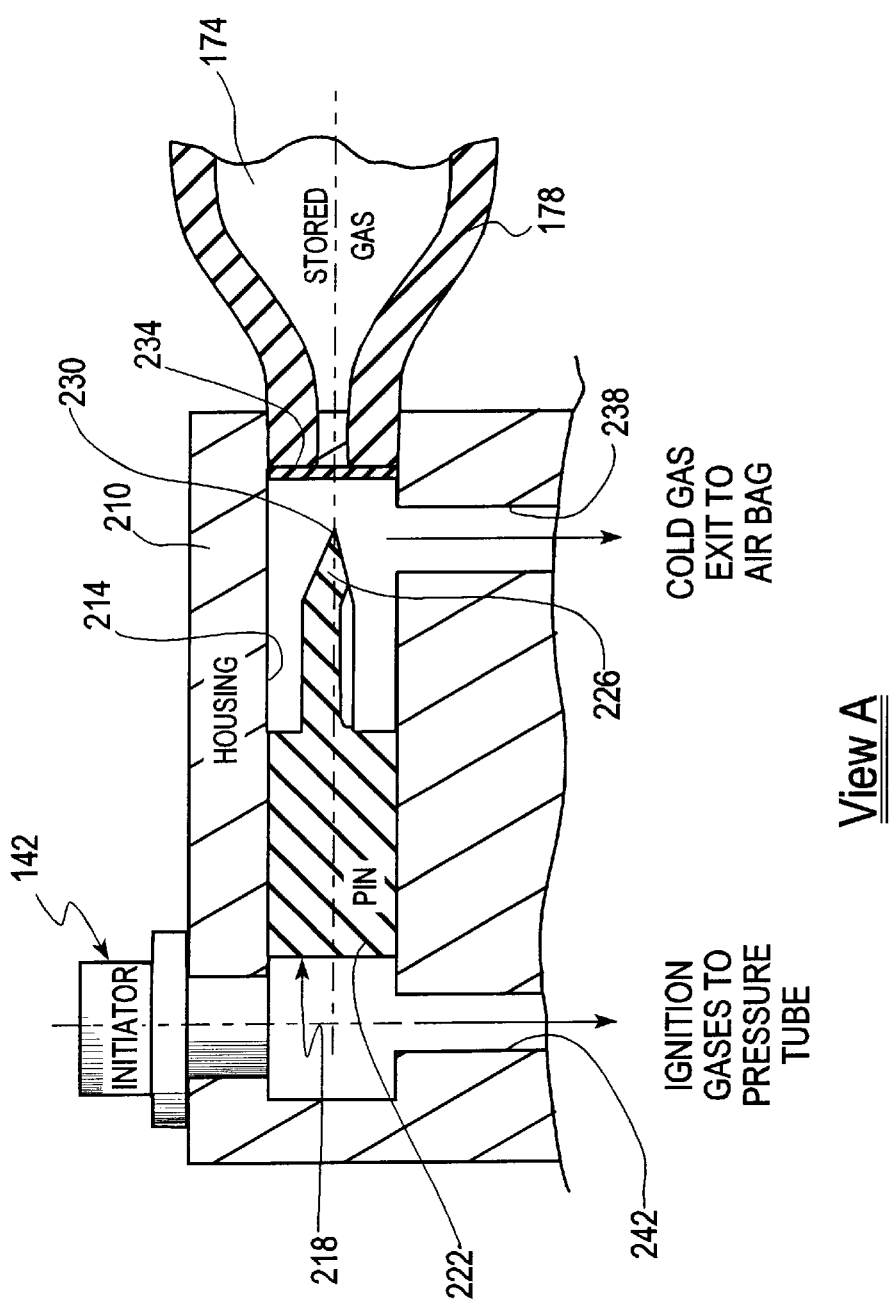
FIG. 10 is an enlarged, fragmentary view illustrating a release device for releasing stored gas from a vessel.

In conjunction with release of the supplemental gas 174, reference is made to FIG. 10, which illustrates one embodiment or way in which the initiator assembly 142 is used to release the stored gas 174, as well as activate the pyrotechnic inflator 138. More specifically, the initiator assembly 142 is joined to a housing 210 of the inflator system 130. The inflator housing 210 has a channel 214 extending laterally within the housing 210. The channel 214 extends from the output end of the initiator assembly 142 to the outlet end of the vessel 178. Disposed within the channel 214 is a release device or pin 218. In the illustrated embodiment, the release device 218 includes a body section 222 and a head 226 having a pointed end or tip 230. Before activation based on the triggering of the initiator assembly 142, the release device 218 is located within the channel 214 to separate or otherwise define the channel 214 as having an initiator channel portion adjacent to the output of the initiator assembly 142 and a vessel channel portion adjacent to the outlet end of the vessel 178. In this arrangement, the release device 218 is spaced downstream of the outlet of the initiator assembly 142 and upstream of the outlet end of the vessel 178.

The outlet end of the vessel 178 is sealed or otherwise covered by a closure member or disk 234 that prevents the escape or release of the stored or supplemental gas 174 until it is opened or ruptured. In that regard, when the initiator assembly 142 is triggered, initiator gases are generated and received by the initiator channel portion. Such initiator gases constitute a pressure and generate a force against the end of the body section 222 of the release device 218 causing it to move in the channel 214 towards the outlet end of the stored gas vessel 178. Subsequently, the tip or point 230 of the head 226 contacts and pierces the closure member 234 thereby releasing the pressurized cold gas 174 from the vessel 178. The supplemental, relatively cold gas or gases that are released from the vessel 178 through the opening created in the closure member 234 exit the outlet end of the vessel 178. Such gas enters the inflatable passage 238, which communicates with the inflatable 134 thereby providing controlled filling of the inflatable 134 with the supplemental gas. In accordance with this embodiment, at essentially the same time, the initiator gases from the initiator assembly 142 pass from the initiator channel portion to a pyrotechnic inflator passage 242 that is in communication therewith. The initiator gases move or flow along the pyrotechnic inflator passage 242 to the confining member 152. Such initiator gases activate or ignite the propellant of the confining member 152 to thereby generate the propellant gases.

Of particular relevance in connection with the operation of the inflator system 130, is the output, which relates to the gas or gases from one or both of the pyrotechnic inflator 138 and the supplemental gas assembly 170 to the inflatable 134. Such output can be defined in terms of a closed tank pressure that is created when the inflator apparatus 138 is activated within the closed tank. This tank pressure also relates to the volume of gas or gases in the inflatable 134 when an inflator apparatus 138, which is equivalent to the inflator apparatus 138 activated in the closed tank, is activated as part of the inflator system 130 in connection with filling the inflatable 134.

With reference to FIG. 11, this output is illustrated and defined in terms of gas volume in the inflatable. In particular, FIG. 11 illustrates a graph of gas volume in the inflatable over time. A solid line graph illustrates the effect or contribution to inflatable gas volume by the propellant gas or gases from the activated pyrotechnic inflator 138. The dashed or intermittent lined graph illustrates the contributions to inflatable gas volume by both the propellant gases from the pyrotechnic inflator 138 and the stored or supplemental gas from the supplemental gas assembly 170.

As can be seen, the output from the combination of pyrotechnic inflator 138 and the supplemental gas assembly 170, which is illustrated in FIG. 11 as an inflatable gas volume, has a peak value or peak output (greatest output) less than 0.1 second after activation of the pyrotechnic inflator 138 and preferably less than 0.03 second after such activation. This peak output is essentially all due to the propellant gases generated by the pyrotechnic inflator 138, particularly the propellant in the confining member 152 thereof. However, over a relatively long period of time, a significant portion of the output and the corresponding gas volume in the inflatable 134 is due to the stored gas being provided by the supplemental gas assembly 170. That is, shortly after 1 second from activation of the pyrotechnic inflator 138, a significant portion of the output in and to the inflatable 134, which is manifested by gas volume therein, is due to the supplemental gas. Importantly, the output, such as in terms of inflatable volume, remains above a predetermined threshold for a predetermined time after activation of the inflator apparatus 138. The output remains at least 40%, and preferably at least 60%, of the peak output for at least 7 seconds after activation of the pyrotechnic inflator 138. As previously noted, such output, in terms of the inflatable 134, means that the gas volume in the air bag or inflatable 134 remains above a corresponding threshold level for a desired period of time. This means that the vehicle occupant is subject to the protective volume in the air bag for a relatively longer period of time and is particularly advantageous where the inflator system 130 is located along the side of the vehicle and is intended to protect the vehicle occupant or occupants when the vehicle is subject to side impacts or collisions that can occur for longer periods of time.

With reference to FIG. 12, a variation of the embodiment of FIG. 9 is illustrated. In this embodiment, the location of the supplemental gas assembly and the release of the stored gas therein are different from that of the embodiment of FIG. 9. As seen in FIG. 12, a supplemental gas assembly 270 is disposed within the pyrotechnic inflator 248 and not outwardly thereof. The supplemental gas assembly 270 is positioned within the timing member 296. The release of the stored or supplemental gas 274 from the vessel 278 is caused by the propellant gases generated by the ignition of the propellant in the confining member 252. In accordance with this embodiment, when the initiator assembly 282 is triggered by the initiator signal that is applied when a predetermined event occurs, the initiator gases that are generated by activation of the initiator assembly 282 are applied to the propellant in the confining member 252 of the pyrotechnic inflator 248. In addition to propellant gases that escape the holes 256 in the confining member 252, propellant gases also are used to cause a release of the stored gas 274. In one embodiment, like the embodiment of FIG. 9, such propellant gases can cause movement of a release device that ruptures a closure member located adjacent an outlet end of the vessel 278. Consequently, the supplemental gas can escape from the stored gas vessel 278 and, like the propellant gases, exits orifices 300 in the timing member 296. Upon exiting the timing member 296, such gases inflate or fill the inflatable 246 of the inflator system 244. Like the embodiment of FIG. 9, a single initiator assembly 282 is involved in two functions. The initiator gases from the initiator assembly 282 directly activate the propellant of the confining member 252. The initiator gases also indirectly cause release of the supplemental gas from the supplemental gas assembly 270. That is, the propellant gases from the confining member 252 are used to release the supplemental gas 274, which propellant gas or gases were generated by means of the initiator gases from the initiator assembly 282. The resulting gases that fill the inflatable 246 constitute a total output and provide inflatable pressure and volume like that discussed in connection with the operation of FIG. 9 and as illustrated in FIG. 11.

Other embodiments can be devised based on the features and principles conveyed in FIGS. 9–12. The supplemental gas assembly 170 might also include a hybrid inflator in which the supplemental gas is comprised of not only stored gas, but generated gas due to ignition of the gas generating material of the hybrid inflator. Regardless of the embodiment, it is important that the weight of the stored gas, whether by itself or part of a hybrid inflator, not exceed a predetermined weight. This requirement is essential in keeping the weight and size of the inflator system at an acceptable and cost effective configuration. In particular, the weight of such stored gas should be no greater than 200 grams. In one preferred embodiment in which the inflator system 130 is a curtain inflator system located along the side of the vehicle, the weight of the stored gas is no greater than about 60 grams. Complimentary to this relatively lower weight of stored gas, the weight of the propellant or gas generating material in the inflator apparatus such as the pyrotechnic inflator 138, 248, is greater than about 4 grams. Lastly, although a preferred embodiment of the inflator system having the supplemental gas assembly involves a curtain or side inflator application, such inventive features need not be limited thereto. The features described and depicted in FIGS. 9–12 also have applicability with passenger, driver and side impact inflators that are not located above the side windows in a vehicle.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method for maintaining pressure in an activated inflatable located in a vehicle, comprising:
   providing stored gas to be received by the inflatable, said stored gas having a weight of less than about 200 grams; and
   activating a propellant to generate a hot propellant gas to be received by the inflatable, wherein the inflatable is subject to a peak output within at least one second after initiating said activating step and an output associated with the inflatable at about seven seconds after initiating said activating step is at least 40% of said peak output.

2. A method, as claimed in claim 1, wherein:
   said providing step includes storing said stored gas in a vessel spaced from said propellant.

3. A method, as claimed in claim 1, wherein:
   said activating step includes supplying said stored gas to the inflatable independently of any factor related to degree of vehicle impact above a threshold thereof.

4. A method, as claimed in claim 1, wherein:
   said activating step includes supplying said stored gas to the inflatable using ignition of an initiator assembly and in which said initiator assembly is also used to cause said propellant gas to be generated.

5. A method, as claimed in claim 4, wherein:
   said providing step includes storing said stored gas in a vessel and ignition of said initiator assembly also causes release of said stored gas from said vessel.

6. A method, as claimed in claim 4, wherein:
   said providing step includes storing said stored gas in a vessel and said initiator assembly is indirectly used to release said stored gas from said vessel using said propellant gas.

7. A method, as claimed in claim 1, wherein:
   said stored gas is free of communication and does not pressurize said propellant before said activating step.

8. A method, as claimed in claim 1, wherein:
   said propellant has a weight of at least about 4 grams.

9. An apparatus for maintaining pressure in an activated inflatable located in a vehicle, comprising:
   a gas generator assembly including a propellant for generating propellant gas;
   an initiator assembly for activating said propellant; and
   a supplemental gas assembly including stored gas;
   wherein said initiator assembly controls operation of each of said gas generator assembly to cause activation of said propellant and release of said stored gas to the inflatable and in which the inflatable is subject to a peak output substantially using the propellant gas within one second of activation of said propellant and an output associated with the inflatable at about seven seconds after activation of said propellant is at least 40% of said peak output using at least said stored gas.

10. An apparatus, as claimed in claim 9, wherein:
    said supplemental gas assembly includes a release device and said initiator assembly, when ignited, is used to cause said release device to release said stored gas for passage to the inflatable.

11. An apparatus, as claimed in claim 9, wherein:

said initiator assembly indirectly controls release of said stored gas using the propellant gas after activation of said propellant.

12. An apparatus, as claimed in claim 9, wherein:

said stored gas has a weight less than about 200 grams.

13. An apparatus, as claimed in claim 9, wherein:

said propellant has a weight of at least about 4 grams.

14. An apparatus, as claimed in claim 9, wherein:

said stored gas is released independently of any factor related to degree of vehicle impact upon ignition of said initiator assembly.

15. An apparatus, as claimed in claim 9, wherein:

said stored gas is free of communication with said propellant before activation of said propellant, wherein said stored gas does not pressurize said propellant.

16. An apparatus, as claimed in claim 9, wherein:

said supplemental gas assembly includes a vessel containing said stored gas and said vessel is spaced from said propellant.

17. An apparatus, as claimed in claim 9, wherein:

said supplemental gas assembly includes a supplemental propellant that, when activated, acts to expand said stored gas.

* * * * *